US010194325B2

(12) United States Patent
Perez et al.

(10) Patent No.: US 10,194,325 B2
(45) Date of Patent: Jan. 29, 2019

(54) BORDER OPTIMIZATION IN LSA

(71) Applicant: Nokia Solutions and Networks Oy, Espoo (FI)

(72) Inventors: Eva Perez, München (DE); Christian Markwart, München (DE); Ruediger Halfmann, Otterberg (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 207 days.

(21) Appl. No.: 15/116,097

(22) PCT Filed: Feb. 6, 2014

(86) PCT No.: PCT/EP2014/052277
§ 371 (c)(1),
(2) Date: Aug. 2, 2016

(87) PCT Pub. No.: WO2015/117649
PCT Pub. Date: Aug. 13, 2015

(65) Prior Publication Data
US 2017/0180998 A1    Jun. 22, 2017

(51) Int. Cl.
H04W 72/00    (2009.01)
H04W 16/14    (2009.01)

(52) U.S. Cl.
CPC .................. *H04W 16/14* (2013.01)

(58) Field of Classification Search
CPC ...... H04W 36/00; H04W 36/04; H04W 16/14
See application file for complete search history.

(56) References Cited

U.S. PATENT DOCUMENTS

| | | | | |
|---|---|---|---|---|
| 8,310,991 B2* | 11/2012 | Kasslin | ............. | H04W 72/1215 370/328 |
| 8,908,647 B2* | 12/2014 | Makino | ................. | H04W 36/30 370/332 |
| 2003/0003918 A1* | 1/2003 | Proctor | ................. | H04W 16/14 455/446 |
| 2005/0096055 A1* | 5/2005 | Colban | ................. | H04L 12/189 455/442 |
| 2007/0293235 A1* | 12/2007 | Inayoshi | ............... | H04W 36/18 455/455 |

(Continued)

FOREIGN PATENT DOCUMENTS

EP    2247132 A1    11/2010
EP    2262298 A1    12/2010

OTHER PUBLICATIONS

International Search Report received for corresponding Patent Cooperation Treaty Application No. PCT/EP2014/052277, dated Feb. 3, 2015, 6 pages.

(Continued)

*Primary Examiner* — Stephen M D Agosta
(74) *Attorney, Agent, or Firm* — Squire Patton Boggs (US) LLP

(57) ABSTRACT

It is provided a method, comprising monitoring if a request for an optimization of a rule affecting a border of a shared resource is received from a first controller; identifying, if the request is received, a second controller having at least a part of the border in common with the first controller; informing the second controller on the request, the rule, and the part of the border.

10 Claims, 14 Drawing Sheets

(56) References Cited

U.S. PATENT DOCUMENTS

| | | | | |
|---|---|---|---|---|
| 2008/0108365 A1* | 5/2008 | Buddhikot | ............ | H04W 16/10 455/452.1 |
| 2008/0214199 A1* | 9/2008 | Ji | ......................... | H04W 16/10 455/452.1 |
| 2012/0106512 A1* | 5/2012 | Banerjea | ............. | H04W 76/026 370/331 |
| 2012/0134328 A1* | 5/2012 | Gauvreau | ............. | H04L 5/0037 370/329 |
| 2013/0215820 A1* | 8/2013 | Redana | ................ | H04W 16/26 370/315 |

OTHER PUBLICATIONS

"RRS (12) 018030FM12084Annex47ReportonASAconcept" ETSI Draft; RRS (12_018030_FM_12_084_Annex_47_Report_On_ASA_Concept, European Telecommunications Standards Institute (ETSI), 650, route Des Lucioles; F-06921 Sophia-Antipolis; France, vol., RRS, May 10, 2012, pp. 1-11 [02.2].

European Office Action issued in corresponding European Application No. 14 703 339.3 dated May 3, 2018.

European Office Action corresponding to Application No. 14 703 339.3, dated Dec. 19, 2017.

* cited by examiner

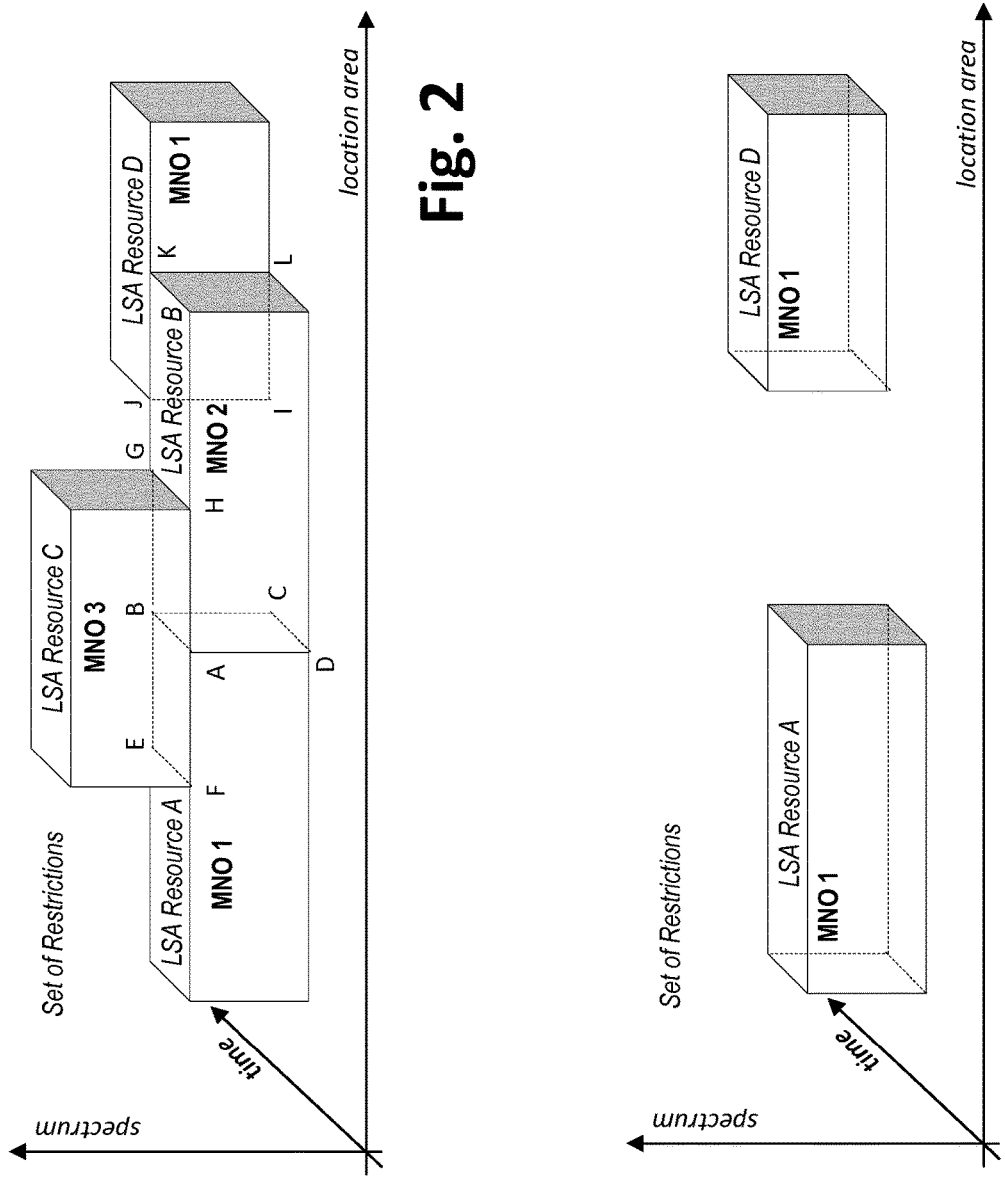

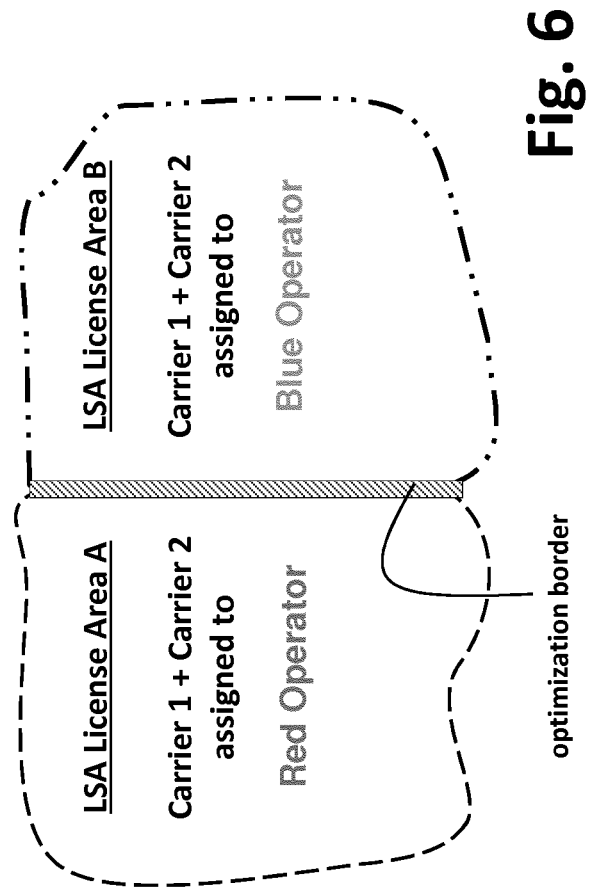

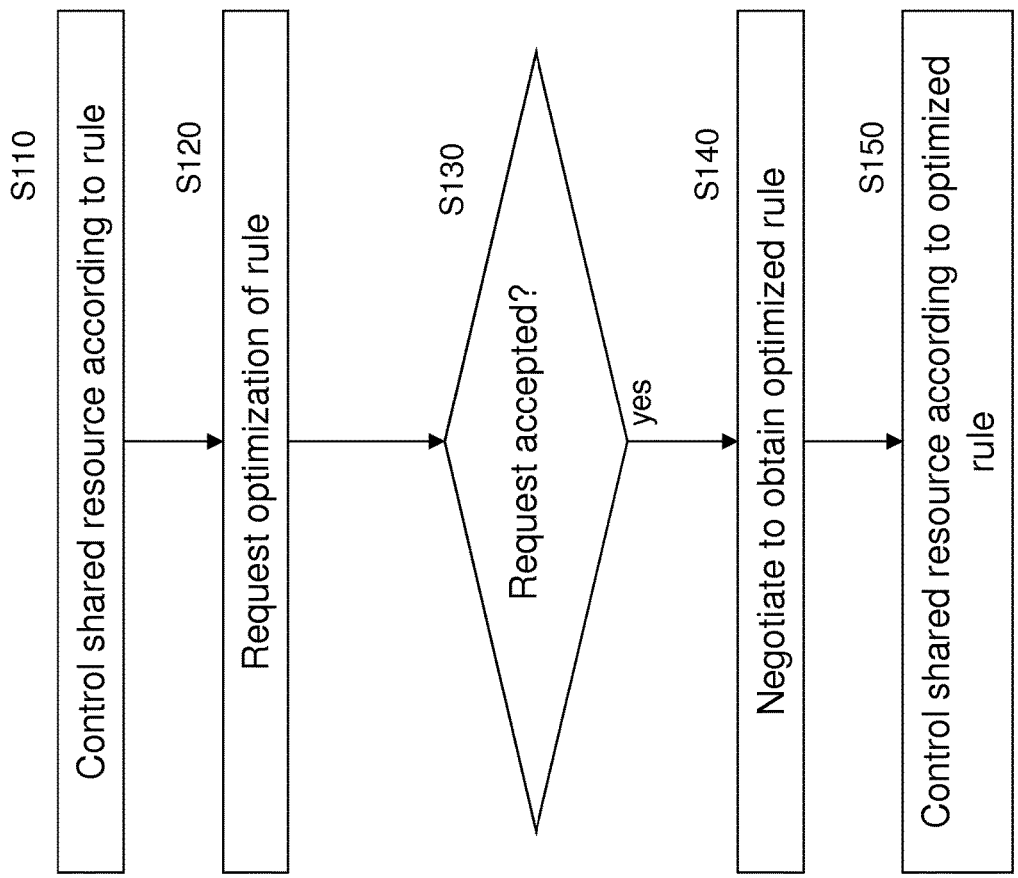
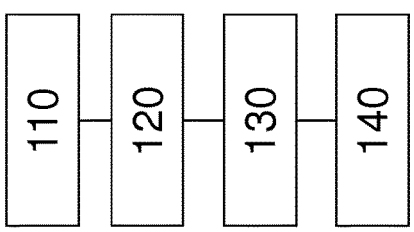

BORDER OPTIMIZATION IN LSA

RELATED APPLICATION

This application was originally filed as Patent Cooperation Treaty Application No. PCT/EP2014/052277 filed Feb. 6, 2014.

FIELD OF THE INVENTION

The present invention relates to an apparatus, a method, and a computer program product related to data communication. More particularly, the present invention relates to an apparatus, a method, and a computer program product related to border optimization in LSA.

BACKGROUND OF THE INVENTION

Abbreviations

3GPP 3$^{rd}$ Generation Partnership Project
ACC Accept
ASA Authorized Shared Access
BS Base Station
C Cell
CEPT Conférence Européenne des Administrations des Postes et des Télécommunications
CONF Confirmation
ETSI European Telecommunications Standards Institute
EU European Union
GSM Global System for Mobile Communications
LC LSA Controller
LLA Licensee-Licensee Agreement
LR LSA Repository
LSA Licensed Shared Access
LTE Long-Term Evolution
LTE-A LTE advanced
MNO Mobile Network Operator
NRA National Telecommunications Regulatory Authorities
OAM Operation Administration & Maintenance
OMS OAM System
OSS Operations Support System
REJ Reject
RRS Reconfigurable Radio Systems
RSPG Radio Spectrum Policy Group
SIR Signal to Interference Ratio
UE User Equipment
WiFi Wireless Fidelity Base stations (Macro, Pico and Femto), which are enabled to use LSA (licensed shared access) spectrum, also known as ASA (authorized shared access) spectrum, may extend the capacity for broadband wireless access. LSA is a third and complementary way of authorising spectrum, in addition to licensed and license-exempt (unlicensed), see e.g. EU RSPG: Report on Collective Use of Spectrum (CUS) and other spectrum sharing approaches RSPG11-392. LSA spectrum is typically owned by an Incumbent (primary user, licensor) who allows other licensed operators (secondary user, licensee) to use this spectrum for their purpose. LSA allows support of different operators by using separated LSA resources. Each LSA resource is defined by a spectrum, a location where this spectrum is used, and further properties like corresponding usage times.

Conventionally, in mobile networks, spectrum utilization and allocation is performed via static configurations based on network planning data of a Mobile Network Operator MNO. With the introduction of LSA it is not longer possible to stay with these static configurations because LSA spectrum needs to be evacuated according to predefined terms and conditions if requested by the incumbent (primary user). The principle of «my spectrum—my usage» will not hold any longer. In other words, the well known static spectrum allocation methods need to be complemented which leads to a paradigm change in mobile communication industry. In addition to the traditional exclusive spectrum assignment there is now also a new method where (in some regions) certain parts of the spectrum may no longer be exclusively assigned to a single operator but jointly assigned to several operators with the obligation to use them collectively.

A main characteristic of LSA is that the incumbent, as the LSA resource owner, may split this LSA resource into parts and contract these parts as LSA sub-resources to different Mobile Network Operators MNO. The LSA concept allows such scenarios as long as one or a set of defined LSA resources are shared exclusively between the Incumbent and a MNO, i.e. a MNO is able to share with the Incumbent only LSA resources, which do not overlap with LSA resources of other MNOs. This basic principle allows supporting different sharing models, like sharing different spectrum parts in the same location area, sharing the same spectrum in different location areas, sharing spectrum in a location area at different times, or a combination of the mentioned methods containing spectrum parts, location, and time conditions.

A main advantage of this concept is that each MNO needs to know only these LSA resources which are part of its sharing agreement with the Incumbent. Other LSA resources of the Incumbent are hidden and may be defined as restrictions to the LSA resources in the sharing agreement. Such restrictions may be defined as rules for transmit and/or receive power levels in adjacent areas, or frequency bands, or rules defining the behavior that needs to be followed when using the LSA resources.

Typically LSA resources and restrictions are managed and maintained together with regulatory rules and sharing agreement rules in a LSA repository. This information is provided to the MNO network via the LSA Controller. FIG. 1 shows the corresponding LSA architecture, as it is defined so far in CEPT and ETSI RRS.

For preparation of ASA/LSA spectrum usage, based on mobile network planning data (e.g. Base Station locations, propagation models, performance measurement data (KPIs), and configuration details of a mobile operator's Radio Access Network (RAN)) and ASA/LSA license definitions (e.g. geographical ASA/LSA license area, ASA/LSA spectrum, usage and lead times, and ASA/LSA reservation areas with respective transmitter/receiver characteristics), the Base Stations and their respective cells (named "Optional Node(s)" in FIG. 1) are identified for the use of the ASA/LSA spectrum. In a second step the Mobile Operator determines all cell configuration parameters for the ASA/LSA spectrum and deploys these configuration data to the respective Base Stations. As a result the Mobile Network is now prepared to use the ASA/LSA spectrum in the ASA/LSA license area. This function is marked in FIG. 1 as Network Configuration & Deployment connected to LSA controller. Activation and deactivation of the ASA/LSA spectrum for the LSA licensee is performed by the LSA spectrum control function, which is connected to the LSA controller, too.

SUMMARY OF THE INVENTION

It is an object of the present invention to improve the prior art.

According to a first aspect of the invention, there is provided an apparatus, comprising initiation monitoring means adapted to monitor if a request for an optimization of a rule affecting a border of a shared resource is received from a first controller; identifying means adapted to identify, if the request is received, a second controller having at least a part of the border in common with the first controller; informing means adapted to inform the second controller on the request, the rule, and the part of the border.

In the apparatus, the identifying means may be adapted to identify the second controller based on information on the shared resource stored in a data repository, wherein the information includes information on the rule; and the apparatus may comprise result monitoring means adapted to monitor if a first proposal for an optimized rule is received from one of the first controller and the second controller; confirmation monitoring means adapted to monitor if a confirmation of the first proposal is received from the other one of the first controller and the second controller; and storing means adapted to store, if the confirmation is received, the first proposal in the data repository as information on the rule.

The apparatus may further comprise forwarding means adapted to forward the first proposal for the optimized rule received from the one of the first controller and the second controller to the other one of the first and second controller; and wherein the confirmation monitoring means may be prevented from considering that the confirmation is received if the confirmation is not received in response to the forwarding of the first proposal.

The apparatus may further comprise first supervising means adapted to supervise if the first proposal matches a first predefined rule; and forward preventing means adapted to prevent the forwarding means from forwarding the first proposal if the first proposal does not match the first predefined rule.

In the apparatus, the confirmation monitoring means may be adapted to consider that the confirmation is received if a second proposal for the optimized rule is received from the other one of the first controller and the second controller from which the first proposal is received, and the second proposal corresponds to the first proposal.

The apparatus may further comprise second supervising means adapted to supervise if the first proposal matches a second predefined rule; and at least one of storage preventing means adapted to prevent the storing means from storing the first proposal if the first proposal does not match the second predefined rule, and agreement providing means adapted to provide an agreement information to at least one of the first controller and the second controller if the first proposal matches the second predefined rule.

In the apparatus, the informing means may be adapted to inform first the second controller on the request; and the apparatus may comprise acceptance monitoring means adapted to monitor if a negotiation acceptance is received from the second controller in response to being informed on the request; wherein the informing means may be adapted to inform the second controller on at least one of the rule and the part of the border only if the negotiation acceptance is received.

In the apparatus, the informing means may be further adapted to at least one of inform the second controller on an identification of the first controller and inform the first controller on an identification of the second controller.

According to a second aspect of the invention, there is provided an apparatus, comprising initiation monitoring processor adapted to monitor if a request for an optimization of a rule affecting a border of a shared resource is received from a first controller; identifying processor adapted to identify, if the request is received, a second controller having at least a part of the border in common with the first controller; informing processor adapted to inform the second controller on the request, the rule, and the part of the border.

In the apparatus, the identifying processor may be adapted to identify the second controller based on information on the shared resource stored in a data repository, wherein the information includes information on the rule; and the apparatus may comprise
 result monitoring processor adapted to monitor if a first proposal for an optimized rule is received from one of the first controller and the second controller; confirmation monitoring processor adapted to monitor if a confirmation of the first proposal is received from the other one of the first controller and the second controller; and storing processor adapted to store, if the confirmation is received, the first proposal in the data repository as information on the rule.

The apparatus may further comprise forwarding processor adapted to forward the first proposal for the optimized rule received from the one of the first controller and the second controller to the other one of the first and second controller; and wherein the confirmation monitoring processor may be prevented from considering that the confirmation is received if the confirmation is not received in response to the forwarding of the first proposal.

The apparatus may further comprise first supervising processor adapted to supervise if the first proposal matches a first predefined rule; and forward preventing processor adapted to prevent the forwarding processor from forwarding the first proposal if the first proposal does not match the first predefined rule.

In the apparatus, the confirmation monitoring processor may be adapted to consider that the confirmation is received if a second proposal for the optimized rule is received from the other one of the first controller and the second controller from which the first proposal is received, and the second proposal corresponds to the first proposal.

The apparatus may further comprise second supervising processor adapted to supervise if the first proposal matches a second predefined rule; and at least one of storage preventing processor adapted to prevent the storing processor from storing the first proposal if the first proposal does not match the second predefined rule, and agreement providing processor adapted to provide an agreement information to at least one of the first controller and the second controller if the first proposal matches the second predefined rule.

In the apparatus, the informing processor may be adapted to inform first the second controller on the request; and the apparatus may comprise acceptance monitoring processor adapted to monitor if a negotiation acceptance is received from the second controller in response to being informed on the request; wherein the informing processor may be adapted to inform the second controller on at least one of the rule and the part of the border only if the negotiation acceptance is received.

In the apparatus, the informing processor may be further adapted to at least one of inform the second controller on an identification of the first controller and inform the first controller on an identification of the second controller.

According to a third aspect of the invention, there is provided an apparatus, comprising controlling means adapted to control a shared resource according to a rule affecting at least a part of a border of the shared resource; requesting means adapted to request, from a repository device, an optimization of the rule; monitoring means adapted to monitor if an acceptance is received in response to the request; negotiating means adapted to negotiate, if the acceptance is received, on the optimization of the rule to obtain an optimized rule; wherein the controlling means adapted to control the shared resource according to the optimized rule.

In the apparatus, the negotiating means may comprise proposal providing means adapted to provide a provided proposal for the optimized rule; acceptance monitoring means adapted to monitor if a providing acceptance for the provided proposal is received; and converting means adapted to convert the provided proposal into the optimized rule if the providing acceptance is received.

In the apparatus, the negotiating means may comprise checking means adapted to check if a received proposal for the optimized rule is acceptable; acceptance providing means adapted to provide, if the received proposal is acceptable, a receiving acceptance; and converting means adapted to convert the received proposal into the optimized rule if the received proposal is acceptable.

In the apparatus, the proposal providing means may be adapted to provide the provided proposal in response to the receiving of the received proposal if the received proposal is not acceptable.

In the apparatus, the negotiating means may be adapted to negotiate directly with a control device different from the repository device.

In the apparatus, the negotiating means may be adapted to negotiate with a control device different from the repository device via the repository device.

The apparatus may further comprise agreement checking means adapted to check if an agreement of the optimized rule is received from the repository device; and control preventing means adapted to prevent the controlling means from controlling the shared resource according to the optimized rule if the agreement is not received.

According to a fourth aspect of the invention, there is provided an apparatus, comprising controlling processor adapted to control a shared resource according to a rule affecting at least a part of a border of the shared resource; requesting processor adapted to request, from a repository device, an optimization of the rule; monitoring processor adapted to monitor if an acceptance is received in response to the request; negotiating processor adapted to negotiate, if the acceptance is received, on the optimization of the rule to obtain an optimized rule; wherein the controlling processor adapted to control the shared resource according to the optimized rule.

In the apparatus, the negotiating processor may comprise proposal providing processor adapted to provide a provided proposal for the optimized rule; acceptance monitoring processor adapted to monitor if a providing acceptance for the provided proposal is received; and converting processor adapted to convert the provided proposal into the optimized rule if the providing acceptance is received.

In the apparatus, the negotiating processor may comprise checking processor adapted to check if a received proposal for the optimized rule is acceptable; acceptance providing processor adapted to provide, if the received proposal is acceptable, a receiving acceptance; and converting processor adapted to convert the received proposal into the optimized rule if the received proposal is acceptable.

In the apparatus, the proposal providing processor may be adapted to provide the provided proposal in response to the receiving of the received proposal if the received proposal is not acceptable.

In the apparatus, the negotiating processor may be adapted to negotiate directly with a control device different from the repository device.

In the apparatus, the negotiating processor may be adapted to negotiate with a control device different from the repository device via the repository device.

The apparatus may further comprise agreement checking processor adapted to check if an agreement of the optimized rule is received from the repository device; and control preventing processor adapted to prevent the controlling processor from controlling the shared resource according to the optimized rule if the agreement is not received.

According to a fifth aspect of the invention, there is provided an apparatus, comprising controlling means adapted to control a shared resource according to a rule affecting at least a part of a border of the shared resource; initiation monitoring means adapted to monitor if a request for an optimization of the border of the shared resource is received; checking means adapted to check if the request is acceptable; receiving means adapted to receive an information on the rule and on at least a part of the border to which the optimization of the rule is related; negotiating means adapted to negotiate, if the request is acceptable, on the optimization of the rule to obtain an optimized rule; wherein the controlling means adapted to control the shared resource according to the optimized rule.

In the apparatus, the negotiating means may comprise proposal providing means adapted to provide a provided proposal for the optimized rule; acceptance monitoring means adapted to monitor if a providing acceptance for the provided proposal is received; and converting means adapted to convert the provided proposal into the optimized rule if the providing acceptance is received.

In the apparatus, the negotiating means may comprise checking means adapted to check if a received proposal for the optimized rule is acceptable; acceptance providing means adapted to provide, if the received proposal is acceptable, a receiving acceptance; and converting means adapted to convert the received proposal into the optimized rule if the received proposal is acceptable.

In the apparatus, the proposal providing means may be adapted to provide the provided proposal in response to the receiving of the received proposal if the received proposal is not acceptable.

In the apparatus, the receiving means may be adapted to receive the information on at least one of the rule and the part of the border only if the request is acceptable.

In the apparatus, the initiation monitoring means may be adapted to monitor if the request is received from a repository device; and the negotiating means may be adapted to negotiate directly with a control device different from the repository device, wherein an identification of the control device is received from the repository device.

In the apparatus, the initiation monitoring means may be adapted to monitor if the request is received from a repository device; and the negotiating means may be adapted to negotiate with a control device different from the repository device via the repository device.

The apparatus may further comprise agreement checking means adapted to check if an agreement of the optimized rule is received from the repository device; and control preventing means adapted to prevent the controlling means from controlling the shared resource according to the optimized rule if the agreement is not received.

According to a sixth aspect of the invention, there is provided an apparatus, comprising controlling processor adapted to control a shared resource according to a rule affecting at least a part of a border of the shared resource; initiation monitoring processor adapted to monitor if a request for an optimization of the border of the shared resource is received; checking processor adapted to check if the request is acceptable; receiving processor adapted to receive an information on the rule and on at least a part of the border to which the optimization of the rule is related; negotiating processor adapted to negotiate, if the request is acceptable, on the optimization of the rule to obtain an optimized rule; wherein the controlling processor adapted to control the shared resource according to the optimized rule.

In the apparatus, the negotiating processor may comprise proposal providing processor adapted to provide a provided proposal for the optimized rule; acceptance monitoring processor adapted to monitor if a providing acceptance for the provided proposal is received; and converting processor adapted to convert the provided proposal into the optimized rule if the providing acceptance is received.

In the apparatus, the negotiating processor may comprise checking processor adapted to check if a received proposal for the optimized rule is acceptable; acceptance providing processor adapted to provide, if the received proposal is acceptable, a receiving acceptance; and converting processor adapted to convert the received proposal into the optimized rule if the received proposal is acceptable.

In the apparatus, the proposal providing processor may be adapted to provide the provided proposal in response to the receiving of the received proposal if the received proposal is not acceptable.

In the apparatus, the receiving processor may be adapted to receive the information on at least one of the rule and the part of the border only if the request is acceptable.

In the apparatus, the initiation monitoring processor may be adapted to monitor if the request is received from a repository device; and the negotiating processor may be adapted to negotiate directly with a control device different from the repository device, wherein an identification of the control device is received from the repository device.

In the apparatus, the initiation monitoring processor may be adapted to monitor if the request is received from a repository device; and the negotiating processor may be adapted to negotiate with a control device different from the repository device via the repository device.

The apparatus may further comprise agreement checking processor adapted to check if an agreement of the optimized rule is received from the repository device; and control preventing processor adapted to prevent the controlling processor from controlling the shared resource according to the optimized rule if the agreement is not received.

In the apparatus according to any of the first to sixth aspects, the shared resource may be defined by a spectrum, a time, and a location, and the border may be related to at least one of the spectrum, the time, and the location.

According to a seventh aspect of the invention, there is provided a method, comprising monitoring if a request for an optimization of a rule affecting a border of a shared resource is received from a first controller; identifying, if the request is received, a second controller having at least a part of the border in common with the first controller; informing the second controller on the request, the rule, and the part of the border.

In the method, the identifying may comprise identifying the second controller based on information on the shared resource stored in a data repository, wherein the information includes information on the rule; and the method may comprise monitoring if a first proposal for an optimized rule is received from one of the first controller and the second controller; monitoring if a confirmation of the first proposal is received from the other one of the first controller and the second controller; and storing, if the confirmation is received, the first proposal in the data repository as information on the rule.

The method may further comprise forwarding the first proposal for the optimized rule received from the one of the first controller and the second controller to the other one of the first and second controller; and preventing from considering that the confirmation is received if the confirmation is not received in response to the forwarding of the first proposal.

The method may further comprise supervising if the first proposal matches a first predefined rule; and preventing the forwarding of the first proposal if the first proposal does not match the first predefined rule.

In the method, it may be considered that the confirmation is received if a second proposal for the optimized rule is received from the other one of the first controller and the second controller from which the first proposal is received, and the second proposal corresponds to the first proposal.

The method may further comprise supervising if the first proposal matches a second predefined rule; and at least one of preventing the storing of the first proposal if the first proposal does not match the second predefined rule, and providing an agreement information to at least one of the first controller and the second controller if the first proposal matches the second predefined rule.

In the method, the informing may comprise informing first the second controller on the request; and the method may comprise monitoring if a negotiation acceptance is received from the second controller in response to being informed on the request; wherein the informing may comprise informing the second controller on at least one of the rule and the part of the border only if the negotiation acceptance is received.

In the method, the informing may comprise at least one of informing the second controller on an identification of the first controller and informing the first controller on an identification of the second controller.

According to an eighth aspect of the invention, there is provided a method, comprising controlling a shared resource according to a rule affecting at least a part of a border of the shared resource; requesting, from a repository device, an optimization of the rule; monitoring if an acceptance is received in response to the request; negotiating, if the acceptance is received, on the optimization of the rule to obtain an optimized rule; and controlling the shared resource according to the optimized rule.

In the method, the negotiating may comprise providing a provided proposal for the optimized rule; monitoring if a providing acceptance for the provided proposal is received; and converting the provided proposal into the optimized rule if the providing acceptance is received.

In the method, the negotiating may comprise checking if a received proposal for the optimized rule is acceptable; providing, if the received proposal is acceptable, a receiving acceptance; and converting the received proposal into the optimized rule if the received proposal is acceptable.

In the method, the providing of the provided proposal may comprise providing the provided proposal in response to the receiving of the received proposal if the received proposal is not acceptable.

In the method, the negotiating may comprise negotiating directly with a control device different from the repository device.

In the method, the negotiating may comprise negotiating with a control device different from the repository device via the repository device.

The method may further comprise checking if an agreement of the optimized rule is received from the repository device; and preventing the controlling of the shared resource according to the optimized rule if the agreement is not received.

According to a ninth aspect of the invention, there is provided a method, comprising controlling a shared resource according to a rule affecting at least a part of a border of the shared resource; monitoring if a request for an optimization of the border of the shared resource is received; checking if the request is acceptable; receiving an information on the rule and on at least a part of the border to which the optimization of the rule is related; negotiating, if the request is acceptable, on the optimization of the rule to obtain an optimized rule; and controlling the shared resource according to the optimized rule.

In the method, the negotiating may comprise providing a provided proposal for the optimized rule; monitoring if a providing acceptance for the provided proposal is received; and converting the provided proposal into the optimized rule if the providing acceptance is received.

In the method, the negotiating may comprise checking if a received proposal for the optimized rule is acceptable; providing, if the received proposal is acceptable, a receiving acceptance; and converting the received proposal into the optimized rule if the received proposal is acceptable.

In the method, the providing of the provided proposal may comprise providing the provided proposal in response to the receiving of the received proposal if the received proposal is not acceptable.

In the method, the receiving may comprise receiving the information on at least one of the rule and the part of the border only if the request is acceptable.

In the method, the monitoring may comprise monitoring if the request is received from a repository device; and the negotiating may comprise negotiating directly with a control device different from the repository device, wherein an identification of the control device is received from the repository device.

In the method, the monitoring may comprise monitoring if the request is received from a repository device; and the negotiating may comprise negotiating with a control device different from the repository device via the repository device.

The method may further comprise checking if an agreement of the optimized rule is received from the repository device; and preventing the controlling of the shared resource according to the optimized rule if the agreement is not received.

In the method according to any of the seventh to ninth aspects, the shared resource may be defined by a spectrum, a time, and a location, and the border may be related to at least one of the spectrum, the time, and the location.

Any of the methods of the seventh to ninth aspects may be a method of border optimization.

According to a tenth aspect of the invention, there is provided a computer program product comprising a set of instructions which, when executed on an apparatus, is configured to cause the apparatus to carry out the method according to any one of the seventh to ninth aspects. The computer program product may be embodied as a computer-readable medium or directly loadable into a computer.

According to some embodiments of the invention, at least one of the following advantages may be achieved:

spectrum usage is enhanced;
quality of service is enhanced;
regulatory and contractual obligations are fulfilled.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein
FIG. 2 shows resources of several MNOs according to respective LSA agreements with an Incumbent;
FIG. 3 shows the resources known to MNO1 of FIG. 2;
FIG. 6 shows an example of adjacent areas of two MNOs being LSA licensees of an Incumbent;
FIG. 12 shows an apparatus according to an embodiment of the invention;
FIG. 13 shows a method according to an embodiment of the invention.

DETAILED DESCRIPTION OF CERTAIN EMBODIMENTS

Figure 1:
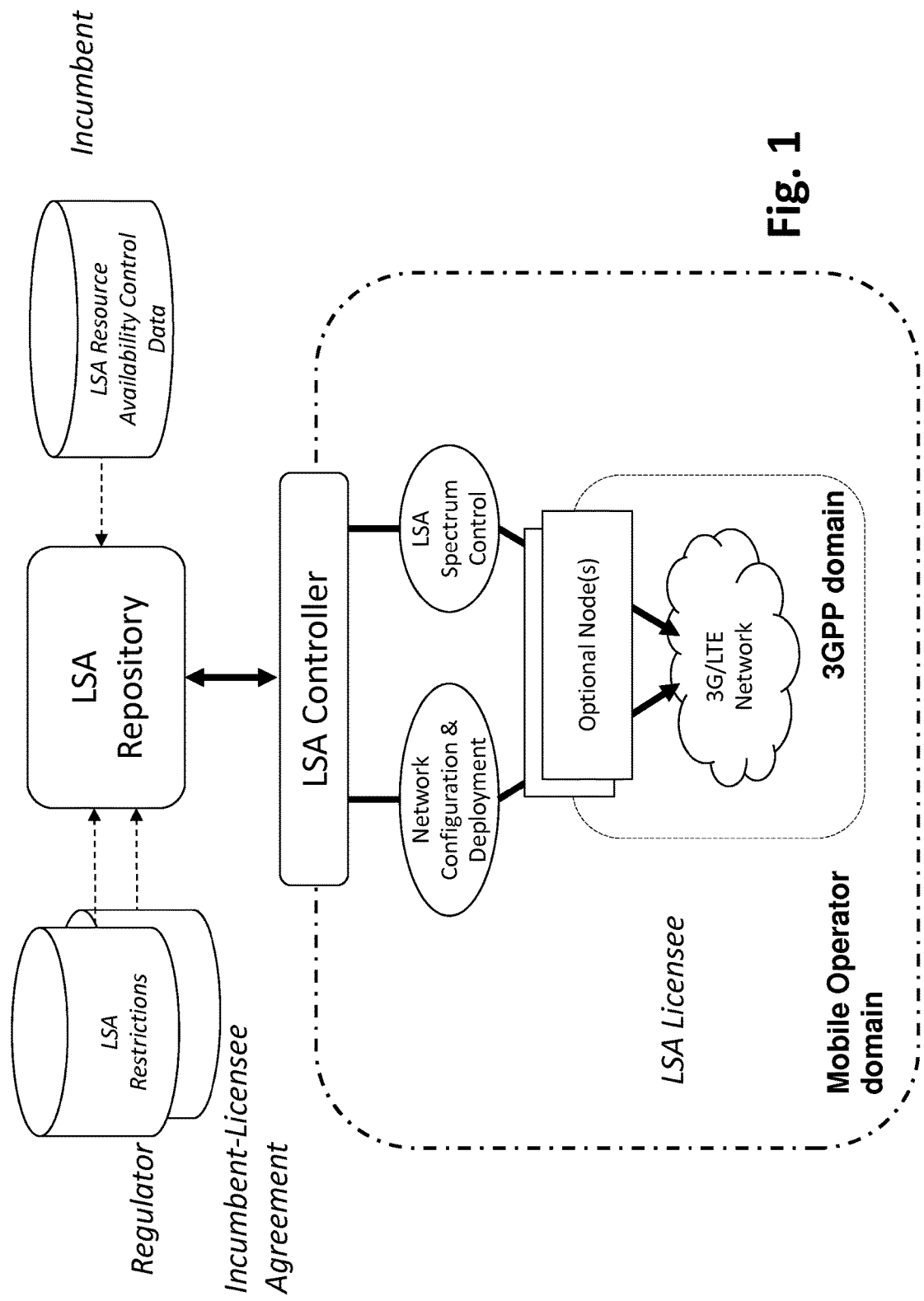
FIG. 1 shows a LSA architecture.

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

In the following, the licensee of the LSA resource is sometimes abbreviated as MNO, and the licensor as Incumbent.

While the LSA system architecture protects data related to the agreement between MNO and Incumbent, there are scenarios where LSA resources are adjacent but belong to different MNOs. Due to the fact that each MNO sees the adjacent LSA resources of other MNOs only as a set of restrictions it is obvious that optimizations of spectrum efficiency are quite impossible without additional functions. FIG. 2 and FIG. 3 show such a scenario and the related problems.

In the example of FIG. 2, three MNOs (MNO1, MNO2, MNO3) are sharing different LSA resources (LSA resources A to D) with an Incumbent. The LSA resources A to D are different from each other in at least one of spectrum (frequency), time, and location area. While the LSA Repository has all information available the LSA resource definitions and sets of restrictions for each of the three MNOs (see FIG. 2), each MNO receives, for security reasons, via the LSA Controller only information about the contracted LSA Resource and the respective set of restrictions. Such information is shown for MNO1 in FIG. 3.

According to embodiments of the invention, it is provided a method that allows MNOs to get information about neighbored MNOs and the respective borders to allow optimizations at the border without violating the security requirements for privacy data stored at the LSA Repository. In addition, in some embodiments the method may allow such optimization without violating restrictions set by the Regulator and/or agreements between Incumbent and LSA Licensees. With such a method it will be possible to optimize neighbored spectrum bands (border A-B-E-F and A-B-G-H in FIG. 2), neighbored location areas (border A-B-C-D in FIG. 2), and serialized time slices (border I-J-K-L in FIG. 2).

Embodiments of the invention provide a method (and a corresponding apparatus) which increases the spectrum efficiency in a LSA environment where an Incumbent shares LSA resources with several MNOs. The method comprises several steps. It starts with the exchange of information between different MNOs to identify respective common borders between them and, in some embodiments, to identify the neighbored MNO. At the end, the agreement optimization restrictions agreed between the MNOs ("MNO-MNO agreement optimization restrictions") may be used to control the resource by the involved MNOs, and they may be provided to the LSA Repository, and may be stored as additional information at the LSA Repository. Furthermore, in some embodiments, a prioritization scheme is provided to guarantee that the added MNO-MNO agreement optimization restrictions do not override Regulator restrictions and/or Incumbent-LSA Licensee Agreements restrictions.

In a LSA environment an Incumbent will share LSA resources with multiple MNOs. Information on all shared LSA resources is stored at the LSA Repository. Each MNO has access, via a LSA Controller dedicated to this MNO only, to the data that are relevant for its LSA resource sharing, i.e. the LSA resource definitions and respective restrictions e.g. from Regulator and due to the agreement between the MNO and the Incumbent. All data that belong to other Incumbent-Licensee agreements are protected and cannot be accessed by the MNO.

Figure 4:
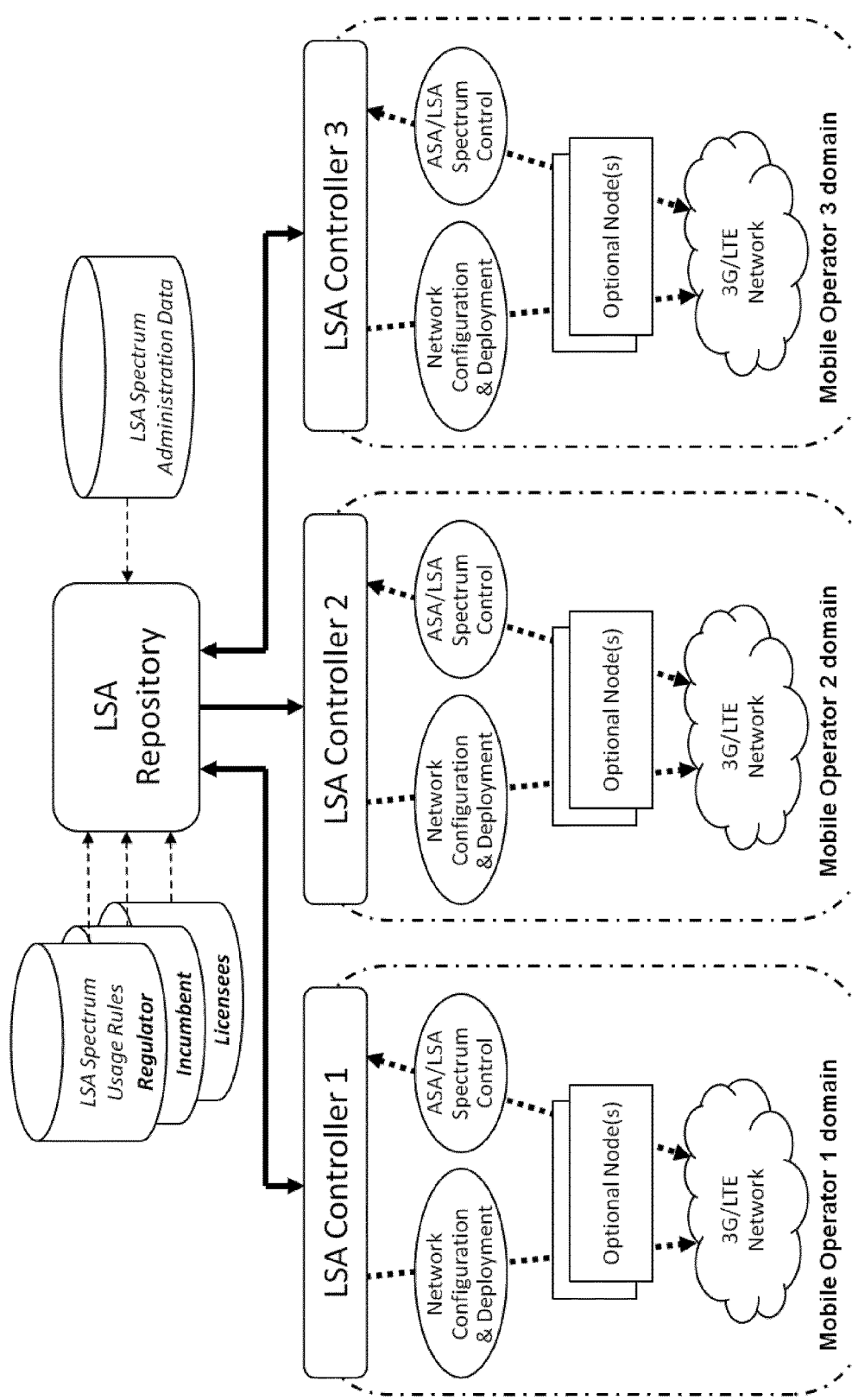
FIG. 4 shows a LSA architecture for three licensees.

FIG. 4-1 shows a typical LSA setup for an Incumbent who shares his resources with 3 MNOs (LSA Licensees). This setup corresponds to the setup of FIG. 1, extended from one to three MNOs. FIGS. 2 and 3 will be used in the further description as a reference to explain how methods according to embodiments of the invention may work.

The LSA Repository LR contains the technical contract data of all LSA Licensees (e.g. LSA resource definitions, LSA resource availability control data, LSA resource restrictions, LSA Licensee data) and is connected to the LSA Controllers. Each Mobile Operator has an own LSA Controller to communicate with the LSA Repository.

Considering the previously described LSA setup, the following message flow will describe the method how the border optimization works. It is assumed that several Operators (Operator 1, Operator 2, and Operator 3 in FIG. 4 represented by the LSA Controllers LC1, LC2, and LC3 in FIG. 5) are sharing LSA resources owned by an Incumbent (represented as LR in FIG. 5).

Figure 5A:
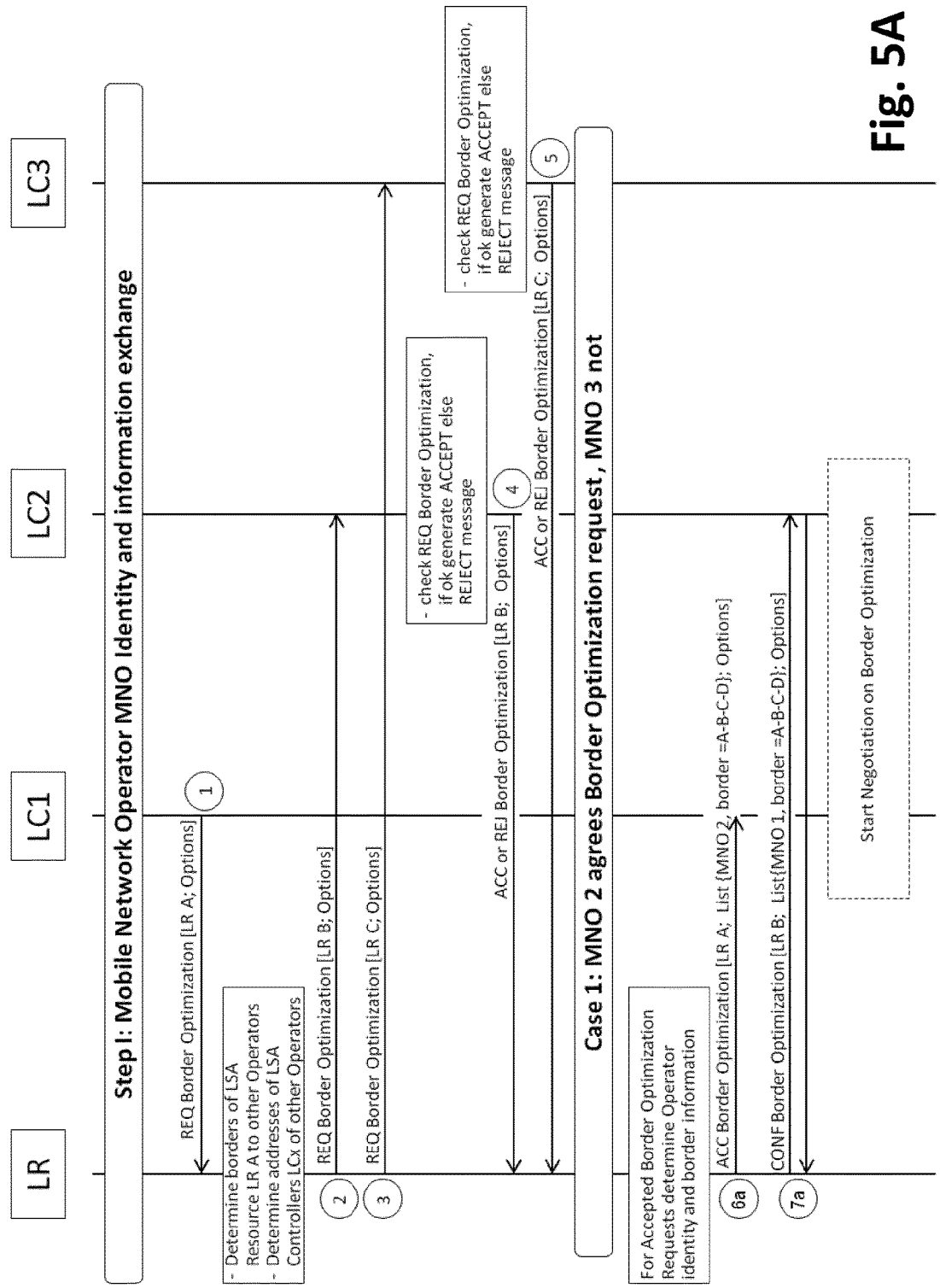
FIGS. 5A to 5D show message flows according to an embodiment of the invention.
Figure 5B:
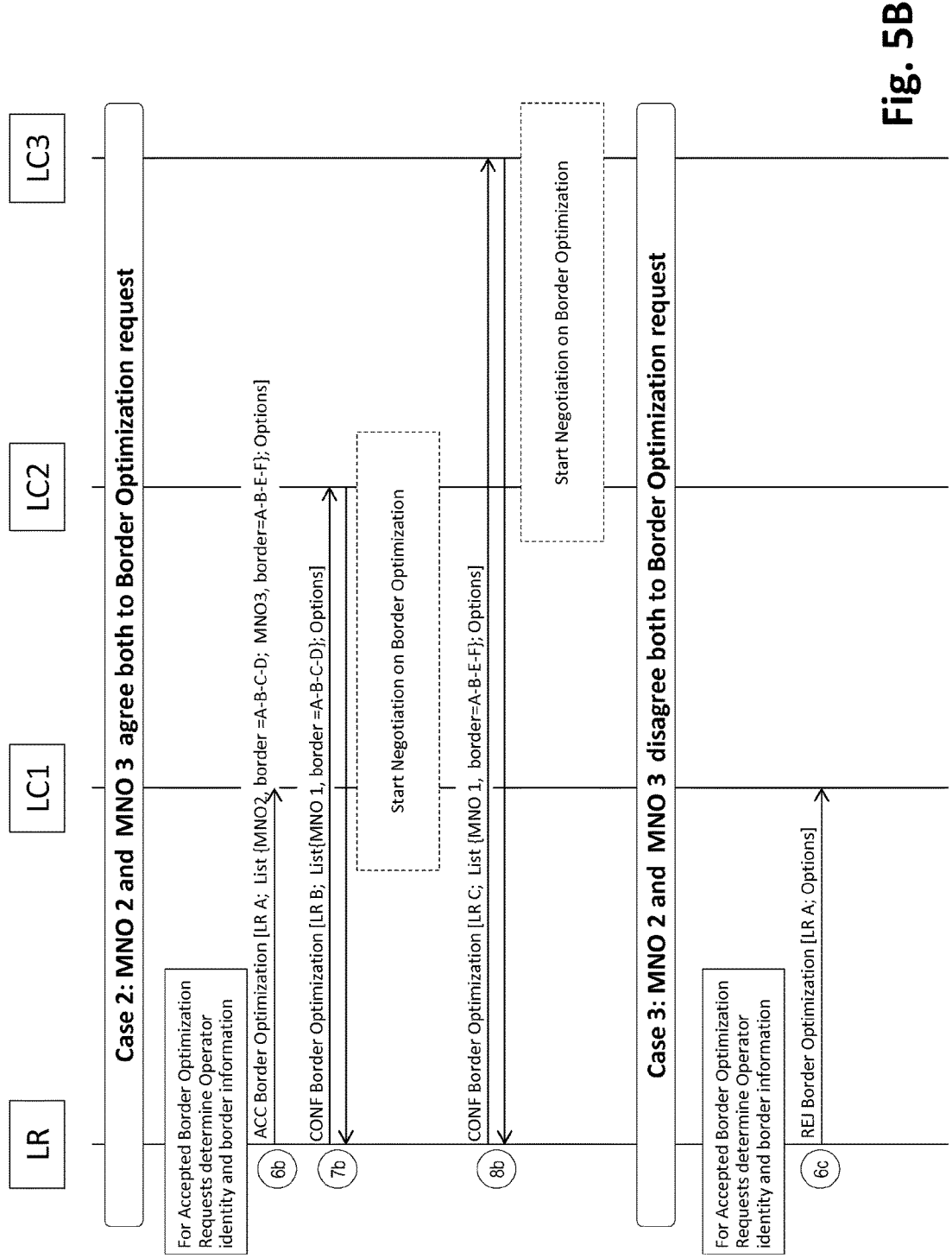

FIGS. 5A to 5D show several message flows according to embodiments of the invention. Each of the message flows starts in FIG. 5A. FIG. 5B shows alternatives for steps 6a and 7a of FIG. 5A. For cases 1 and 2 of FIGS. 5A and 5B, the message flow then follows one of FIGS. 5C and 5D. Some modifications of these message flows are outlined in the present description.

The first step (FIG. 5A) of each of the message flows is to check if operators are willing to exchange information in order to optimize their LSA resources. Operator 1 is not aware of the LSA spectrum usage outside of its own Licensee Area, therefore it will inform its willingness for border optimization sending a REQ Border Optimization to the LSA Repository LR (message 1). Message 1 includes options, e.g. one or more rules, which MNO1 is interested to optimize.

For example, an operator may be willing to optimize its border (or a part of it) and, thus, start the message flow of FIG. 5 because high interference is detected. If interference is detected for only a part of the border, he might be willing to optimize only this part. A part could be restricted by one or more dimensions of the border (spectrum, time, and location) or by an extent within one or more of these dimensions (e.g. a certain time duration or a certain area only). For example, in the scenario of FIG. 2, MNO1 might be willing to optimize border A-B-C-D of resource A only, but not border A-B-E-F of resource A and none of the borders of resource D.

The LR will determine which are the borders between LSA resources from Operator 1 and the LSA resources from the other Operators (e.g., in FIG. 2, Operator 1 and Operator 2 have two common borders: A-B-C-D in location area, I-J-K-L in time, and Operator 1 and Operator 3 have one common border A-B-E-F in frequency). The LR will also determine the addresses of the LC controlling the LSA resources from the other Operator(s) in order to start the communication with them.

Once the border information and the LC addresses are determined, the LR will send REQ Border Optimization (messages 2, 3), including optional information such as border type. The border type information may be used to address specific optimizations at locations, frequency, time borders or combinations of them. The other operator(s) may accept or reject the optimization request sending an ACC/REJ Border Optimization to the LR (message 4, 5) respectively through their LCs, including optional information such as reject reason.

Once the LR is aware of which operator accepts the border optimization, it will mediate the required information exchange between the operators accepting the optimization. This information exchange may comprise exchanging operator identity/identities, border(s) information and other options, which will allow the involved operators to start the negotiation.

If some operator accepts, the LC1 will receive an ACC Border Optimization from the LR (message 6a). If just Operator 2 accepts (case 1), just Operator 1 and 2 will exchange the identity and border information (messages 7a).

If both operators accept the border optimization request (case 2), the identity and border information will be exchanged between Operator 1 and 2 (messages 7b) and between Operator 1 and 3 (messages 8b). If no operator accepts, LR will send a REJ Border Optimization to the Operator 1 (message 6c), and there will not be identity or border information exchange.

In some embodiments of the invention, the flow of information may be modified. E.g., messages 2 and 3 may comprise the information provided in steps 7a (7b) and 8b, respectively. Since MNO1 is willing to optimize its border, he might agree to provide this information to the other operator(s) even if he does not know if they accept his request. Thus, one message exchange may be saved. In some embodiments, MNO1 may indicate in his request whether or not he agrees to provide this information in the initial request to another MNO.

Furthermore, according to some embodiments, LR might not provide the identity of the other MNOs to each (or some) of the MNOs. If the identity is not provided to any of the LCs, LR will mediate the negotiation between the MNOs. That is, each LC sends its proposals and its acceptance or rejection of the proposals of the other MNO(s) to LR, which forwards it to the respective other LC.

Otherwise, if the identity of one of MNO1 and MNO2 (MNO3) to only one of the other operators (e.g. MNO2 is informed about the identity of MNO1 but MNO1 is not informed about the identity of MNO2), the informed MNO may initiate a direct negotiation with the uninformed MNO, using the known identity of the uninformed MNO.

In case at least one of MNO2 and MNO3 accepts to negotiate, MNO2 and MNO3 will negotiate on border optimization and may obtain a negotiation result (i.e. one or more optimized rules). The negotiations may be performed directly between the LCs or mediated by LR.

Figure 5C:
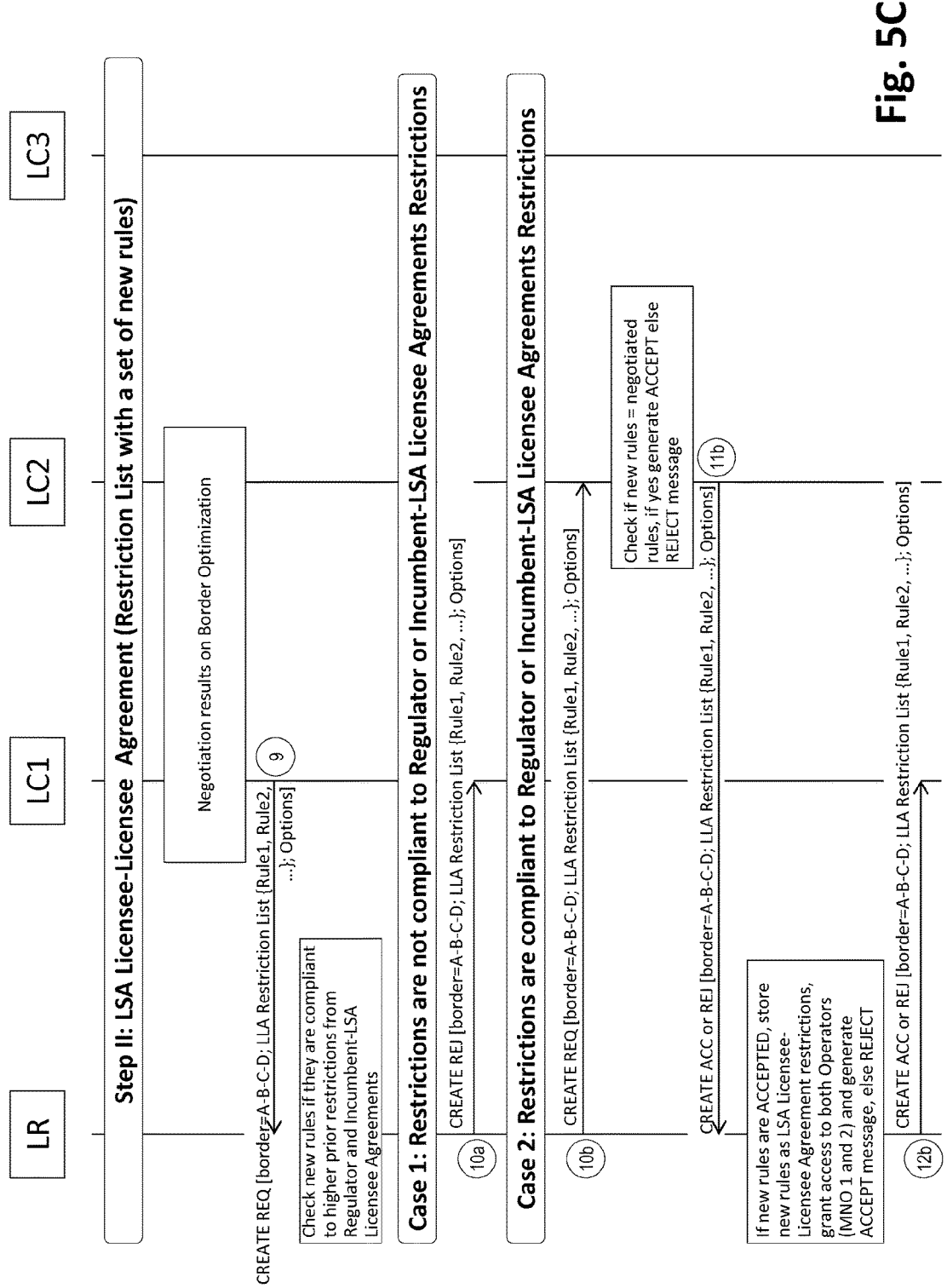

The second step (STEP II), shown in FIG. 5C, starts with the establishment of the LSA Licensee-Licensee Agreement. Once operators agree on the set of new rule(s) for the border optimization, one of the MNOs (e.g. the Operator who started the Optimization process, as shown by message 9 of FIG. 5C) starts to establish the agreed rule(s) in the LSA Repository LR. The Operator has access to the LR via his LC, i.e. in the example Operator 1 represented by LC1 will send a CREATE REQ containing the set of rules to the LR (message 9).

The LR may check if the new rule(s) are compliant to higher priority restrictions from Regulator and Incumbent-LSA Agreements, i.e., in these embodiments, the new rule(s) must be compatible with e.g. the existing rules between operators, and/or with the rules established between operators and incumbent, and/or with the Repository rules, whereof the latter may have the highest priority.

If the rule(s) are not compliant (case 1) the LR may send a CREATE REJ to LC1 (message 10a).

If the rule(s) are compliant, the Operator 2 may review the set of rules that LR has received from Operator 1, in order to review that nothing has been modified. LR will sent the rule(s) to the LC2 in a CREATE REQ (message 10b), who will accept or reject them via an ACC or REJ CREATE REQ sent to the LR (message 11b). Finally, if the new rule(s) are also accepted by LC2, they may be stored at the LR, and a CREATE ACC (message 12b) may be sent to LC1. If the rule(s) are not accepted by LC2, a CREATE REJ will be sent to the LR and the rule(s) will not be stored at the LR.

If the new rule(s) are accepted by LC1, LC2, and LR, they will be applied by MNO1 and MNO2.

Figure 5D:
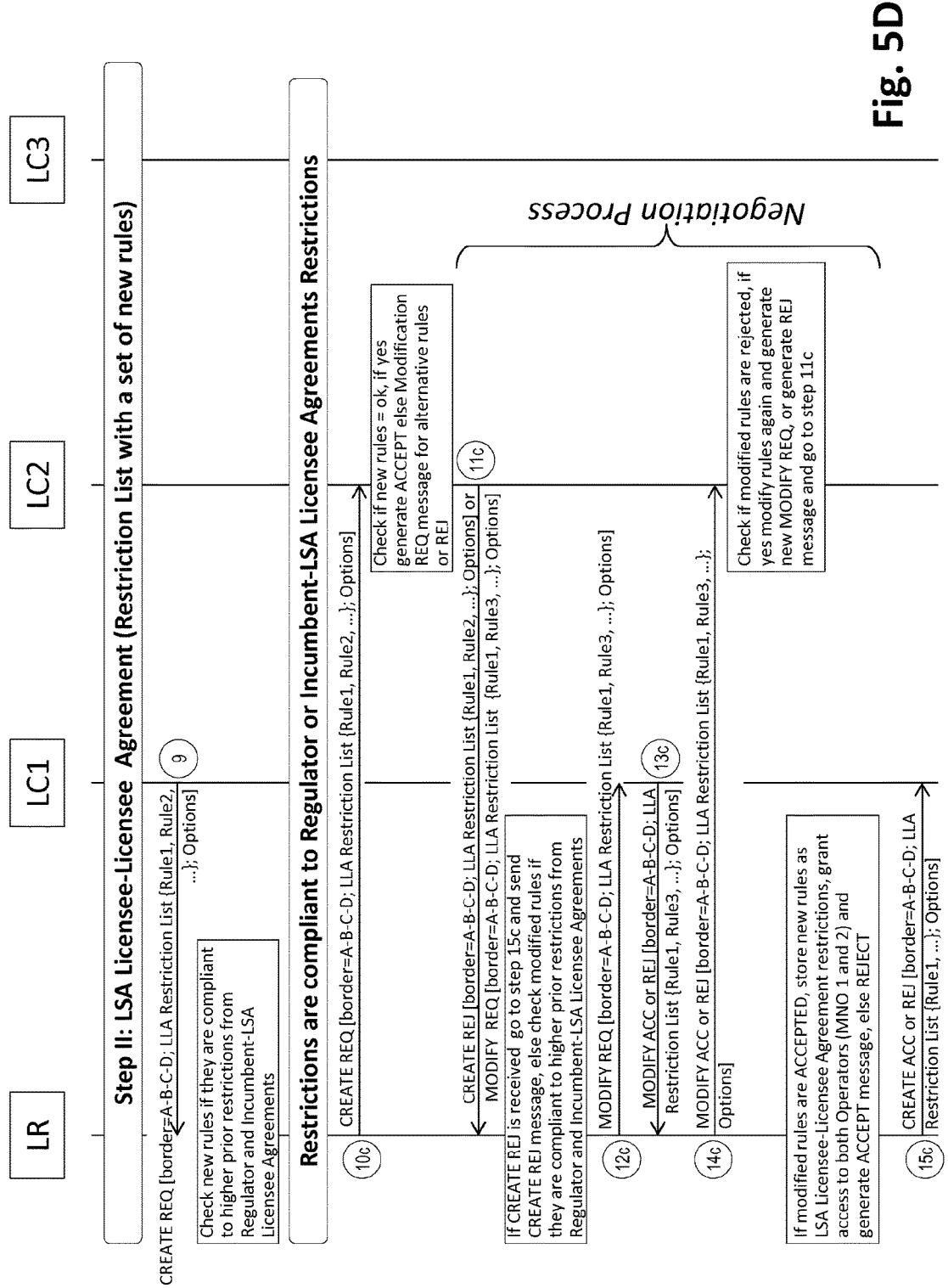

FIG. 5D shows an alternative to the flow of steps 10a to 12b of FIG. 5C according to an embodiment of the invention. In detail, if LC2 does not accept the modified rule(s) (optimized rule(s)) proposed by LC1 to LR (message 9), instead of rejecting the proposal (REJ in message 11b), it may propose modified rule(s) (Rule 1, Rule 3, ... ) instead of (Rule 1, Rule 2, ... ), according to step 11C. Then, LR may check if the modified rule(s) are compliant to the higher priority rule(s) and, if compliant, may ask LC1 by MODIFY REQ if it accepts the modified rule(s) (message 12c).

Depending on whether LC1 accepts or rejects the new rule(s) (message 13c), LR will inform LC2 accordingly (message 14c). If the new rule(s) are accepted, LR will store them in the repository and MNO1 and MNO2 will adopt the new rule(s).

In some embodiments of the invention, a limitation function for negotiation iterations is introduced to the LSA Repository LR. The negotiation limitation function acts as a neutral instance and may be used to avoid too many iteration steps for modification proposals from Operators and closes CREATE REQUEST transactions if the maximum number of iteration steps is achieved. In some embodiments, corresponding limitation functions may be implemented in one or more of the LCs.

When the border optimization process is established successfully (Step I performed and optimized rule(s) (also named LSA Licensee-Licensee rule(s)) for a border between the Operators are available and, depending on the embodiment, stored in the LR), a third step may be established in some embodiments of the invention:

To cover scenarios where LSA Licensee-Licensee rules need to be modified or even deleted e.g. for further optimizations between Operators or when the LSA sharing agreement between an Operator and Incumbent terminates, MODIFY and/or DELETE messages may be implemented. The additional message flows for MODIFY and DELETE use the same message flow logic as shown for CREATE of Step II in FIG. 5C and FIG. 5D, but replaces CREATE by MODIFY or DELETE.

In some embodiments, due to the higher priority of Regulator rules and Incumbent-Licensee Rules, LSA Licensee-Licensee rules are checked by the LR whenever a higher priority rule is changed. When the LR detects that a LSA Licensee-Licensee rule is no longer compliant to a higher priority rule, it may inform the involved Operators about the new situation to allow the start of respective CREATE, DELETE, and MODIFY procedures. In general such changes are not time critical, because the LSA concept foresees a longer lead time before new rules needs to be considered by Incumbents and LSA Licensees.

In some cases, the DELETE procedure may be automated, without any further check. When, for example, an Incumbent LSA Licensee agreement expires and both parties do not renew the agreement, the LR should DELETE the corresponding LSA Licensee-Licensee rules. A safe DELETE process, which includes, for example, a deactivation step before the actual DELETE step, may be foreseen.

The example in FIG. 6 shows a typical scenario for a location area border optimization in a 3GPP mobile network. According to the LSA concept, the Incumbent offers in different location areas the same 2 carriers of 10 MHz in the 2.3 GHz-2.4 GHz range to different MNOs (named Red Operator and Blue Operator, wherein the names are not limiting). The license area A of Red Operator and license area B of Blue Operator are neighbored but exclusive.

Therefore Red Operator is allowed to operate both carriers in area A and the Blue Operator is allowed to operate both carriers in area B.

Figure 7:
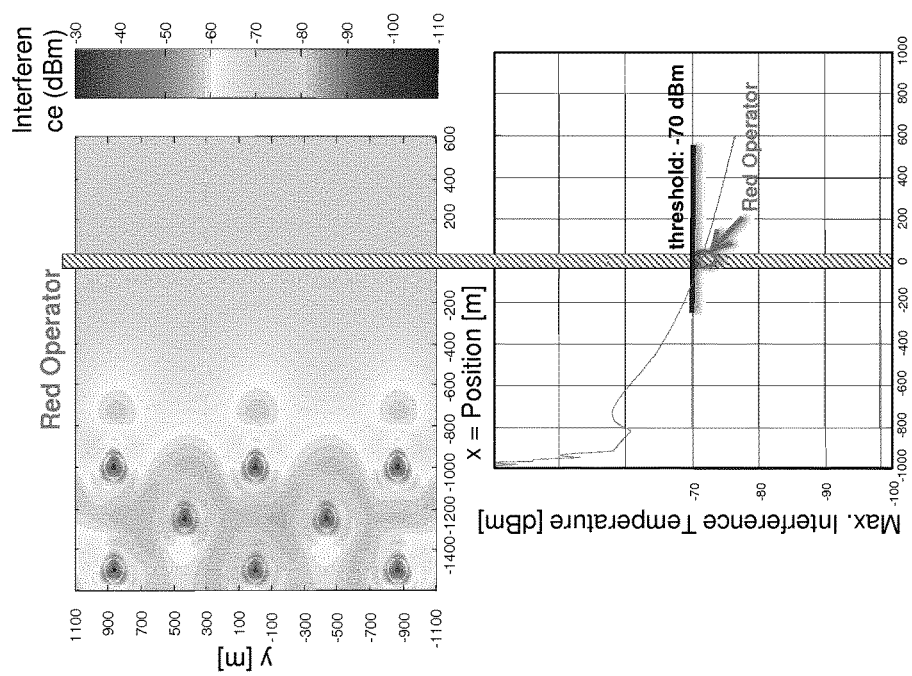
FIG. 7 shows simulation results of interference at a geographical border for one of the MNOs of FIG. 6.

The upper part of FIG. 7 shows, as an example, a simulation of interference levels observed by the Blue Operator (the operator on the right side) by base stations of the Red operator. It is shown a top view on an area including the border between the two operators which is at position x=0 (dashed line). The colors (grey levels) indicate interference levels (in dBm) as according to the scale on the right. Base stations of the Red Operator are regularly arranged at a distance of 1000 m (x=−1000 m) or more from the border. They are clearly visible as red (dark) dots indicating that high interference is caused for the Blue operator at these locations. In the simulation, the base stations transmit into three directions (0°, 120°, and 240° relative to the positive x-axis), and it is assumed that the area is flat (without obstacles to the radiation).

Let's take a closer look to the top of FIG. 7 related to the network of Red Operator. It is assumed that the incumbent has set the thresholds of the borders such that the MNO is not allowed to exceed the receive power level outside the licensing area by more than −70 dBm. Therefore, the minimum distance of the base stations with the chosen setup (46 dBmTx, 32 m height, tilt −3°) has to be at least 1000 m to the border. The bottom of FIG. 7 shows the maximum interference temperature (in dBm) dependent on the x-coordinate (distance from the border), wherein maximum means a maximum over all y-coordinates (parallel to the border) for the given x-coordinate. As can be seen from the bottom part of FIG. 7, the maximum power level (interference temperature) is not exceeded at the border.

Figure 8:
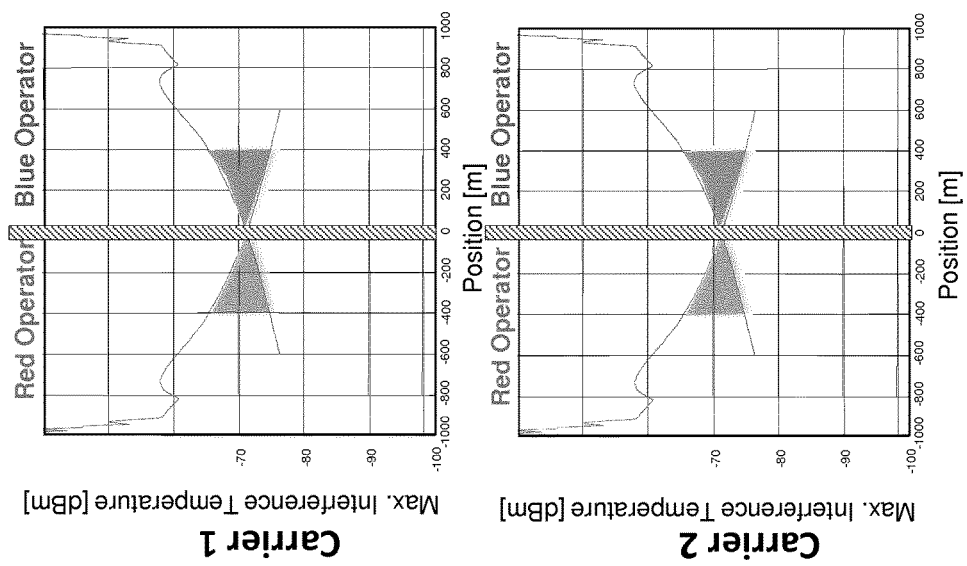
FIG. 8 shows the simulation results of FIG. 7 (bottom diagram) separated per carrier.

FIG. 8 corresponds to the bottom of FIG. 7, but max. interference temperature is shown separately for carrier 1 (top diagram) and carrier 2 (bottom diagram). Corresponding (basically mirrored) figures would apply to Blue Operator. FIG. 8 illustrates how the networks of each operator may impact the other. The dashed regions on both sides of the border indicate where the SIR is less than 10 dB due to the interference from the neighboring network. It can be observed that on both carriers in an area of 400 m from the border both operators experience a high interference from the neighbor.

A mutual agreement between both MNO, where, for example, Blue Operator agrees to decrease the border threshold for the first carrier (Carrier 1) from −70 dBm to −90 dBm while Red Operator as a quid pro quo decreases his border threshold on the second carrier (Carrier 2) in the same range, is beneficial for both. Please note that the framework defined by the regulator and incumbent still remains unchanged.

Figure 9:
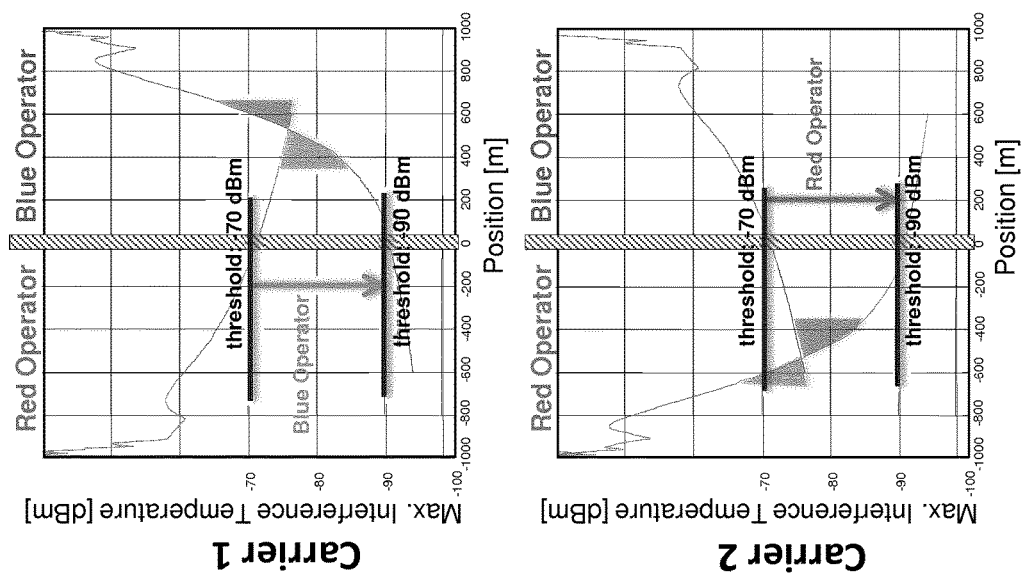
FIG. 9 shows simulation results corresponding to those of FIG. 8, after a rule has been optimized according to an embodiment of the invention.

FIG. 9 shows the maximum interference temperature for both carriers if the agreement is met. As depicted in FIG. 9 the 'high' interference region is moved for one carrier into the area of the neighboring operator which allows to operate an almost interference free network in the border region with extremely high capacities which (over-) compensate the capacity loss on the second carrier. Reduction of the border threshold can be realized by different measures, e.g. increase of the antenna tilt or reduction of the transmitted power (in the simulation of FIGS. 7 to 9, antenna tilt is increased).

In some embodiments, the check by LR for compliance with higher priority rules may be omitted. In these cases, the new rules (optimized parameter(s)) may be adopted by MNO1 and MNO2 after their agreement. Nevertheless, in some of these embodiments, one of MNO1 and MNO2 may still inform LR, i.e. message 9 of FIG. 5 will take place.

In some embodiments, the roles of LC1 and LC2 in step II may be exchanged. I.e., any of LC1 and LC2 may inform LR first on the result of optimization.

In some embodiments, instead of a confirmation procedure as according to e.g. messages 10b and 11b of FIG. 5C and messages 12c, 13c of FIG. 5D, each of LC1 and LC2 may inform LR separately on the result of the optimization. If these pieces of information received by LR match each other, LR may assume that the result of optimization is confirmed by both LCs.

If the negotiation between LCs is mediated by LR, LR may check during negotiation if the respective proposal fits to the higher priority rule(s) such as those of the regulator. It may forward a proposal of one MNO to the other MNO only if it matches the higher priority rule(s), otherwise it may reject the proposal without forwarding it.

Figure 11:
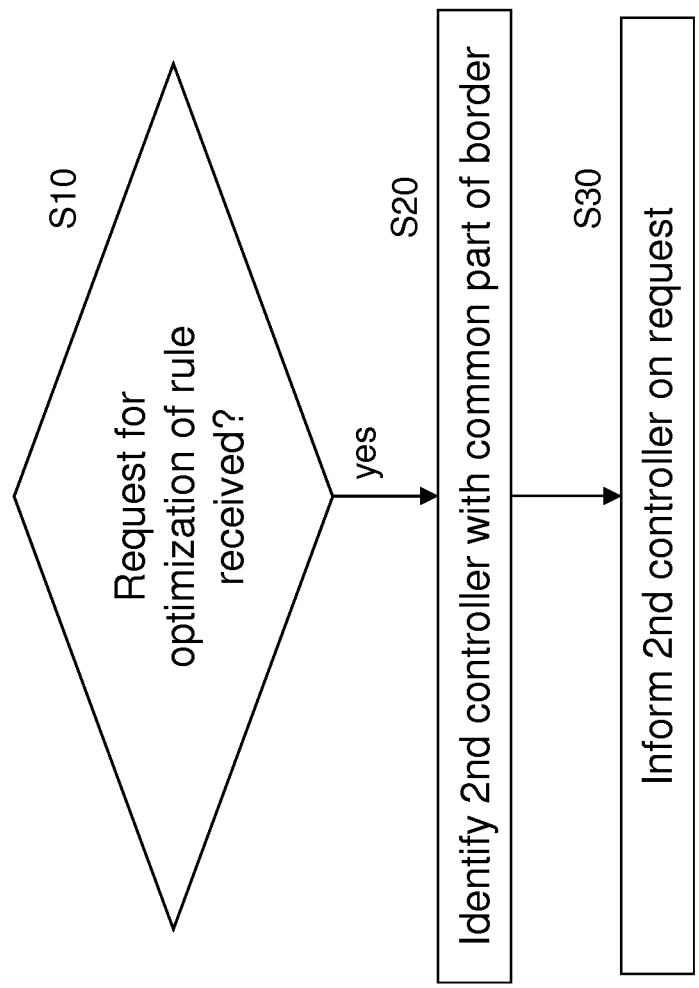
FIG. 11 shows a method according to an embodiment of the invention.
Figure 10:
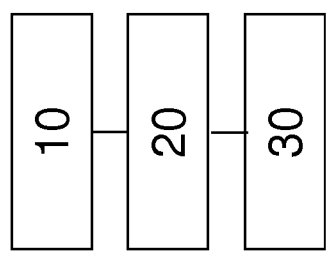
FIG. 10 shows an apparatus according to an embodiment of the invention.

FIG. 10 shows an apparatus according to an embodiment of the invention. The apparatus may be an LSA repository or an element thereof. FIG. 11 shows a method according to an embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises initiation monitoring means 10, identifying means 20, and informing means 30.

The initiation monitoring means 10 monitors if a request for an optimization of a rule affecting a border of a shared resource is received from a first controller (S10). The first controller may be an LSA controller.

The identifying means 20 identifies, if the request is received, a second controller having at least a part of the border in common with the first controller (S20). The second controller may be an LSA controller. The first controller may be different from the second controller. In particular, the first controller may be related to a different operator than the second controller.

The identification may be based on a repository such as a LSA repository, wherein information properties of the shared resource is stored which may include information on the sharing and/or the rule. According to the repository, the shared resource may be shared by the operator to which the first controller belongs and the operator to which the second controller belongs.

The informing means 30 informs the second controller on the request, the rule, and the part of the border (S30). Thus, the informing means may initiate a negotiation between the first and second controllers on the optimization of the rule.

In some embodiments, the apparatus will check if an optimized rule obtained as a result of the negotiation complies to higher priority rules such as those set by the regulatory authority. In some embodiments, the apparatus will store the optimized rule in the repository if it is agreed by the first and second controllers and, if applicable, complies with the higher priority rules.

FIG. 12 shows an apparatus according to an embodiment of the invention. The apparatus may be an LSA controller or an element thereof. FIG. 13 shows a method according to an embodiment of the invention. The apparatus according to FIG. 12 may perform the method of FIG. 13 but is not limited to this method. The method of FIG. 13 may be performed by the apparatus of FIG. 12 but is not limited to being performed by this apparatus.

The apparatus comprises controlling means 110, requesting means 120, monitoring means 130, and negotiating means 140.

The controlling means 110 controls a shared resource according to a rule (S110). The rule affects at least a part of a border of the shared resource. The shared resource and its border may be defined by spectrum (frequency), time, and location (area).

The requesting means 120 requests an optimization of the rule (S120). The request may be directed to a repository such as an LSA repository. More in detail, the requesting means may request starting a negotiation on the optimization of the rule.

The monitoring means 130 monitors if an acceptance is received in response to the request (S130), i.e. whether or not the request is accepted. If the acceptance is received (yes in step S130), the negotiating means 140 negotiates on the optimization of the rule to obtain an optimized rule (S140). If an optimized rule is obtained (i.e., if the negotiations were successful such that an agreement on the optimized rule could be reached), the controlling means 110 controls the shared resource according to the optimized rule (S150). I.e., for the controlling means 110, the optimized rule replaces the rule.

Figure 15:
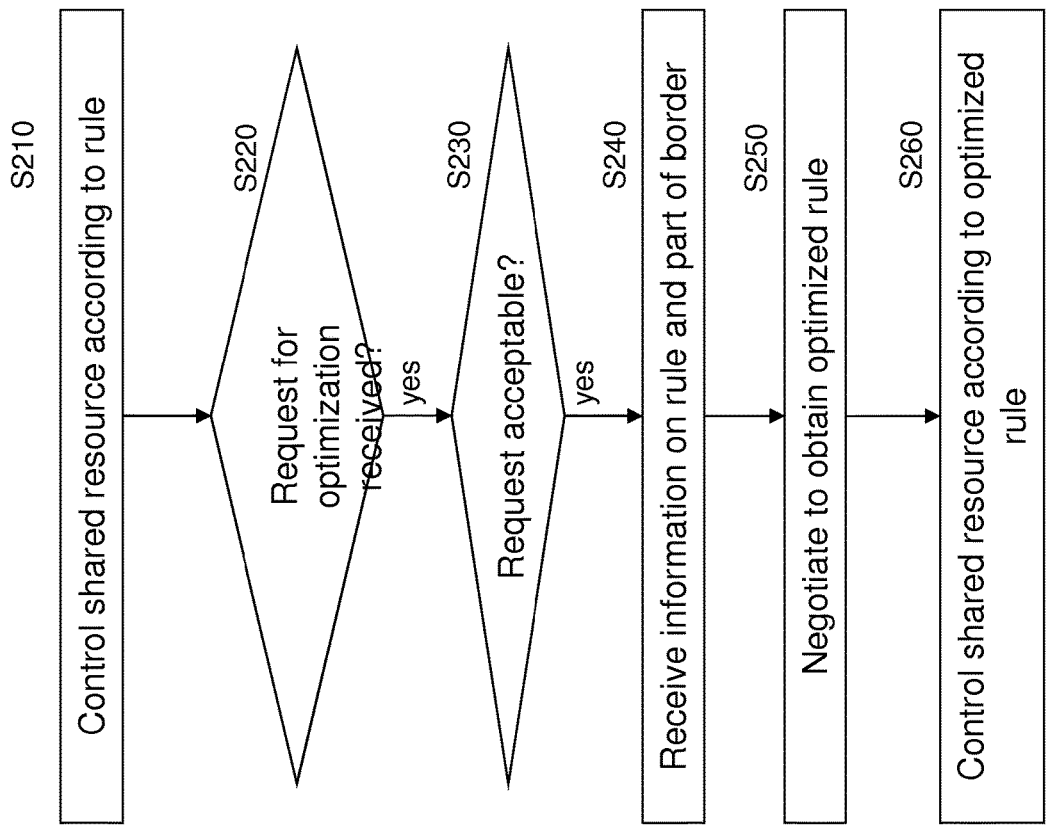
FIG. 15 shows a method according to an embodiment of the invention.
Figure 14:
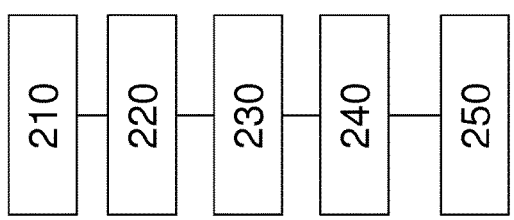
FIG. 14 shows an apparatus according to an embodiment of the invention.

FIG. 14 shows an apparatus according to an embodiment of the invention. The apparatus may be an LSA controller or an element thereof. FIG. 15 shows a method according to an embodiment of the invention. The apparatus according to FIG. 14 may perform the method of FIG. 15 but is not limited to this method. The method of FIG. 15 may be performed by the apparatus of FIG. 14 but is not limited to being performed by this apparatus.

The apparatus comprises controlling means 210, initiation monitoring means 220, checking means 230, receiving means 240, and negotiating means 250.

The controlling means 210 controls a shared resource according to a rule (S210). The rule affects at least a part of a border of the shared resource. The shared resource and its border may be defined by spectrum (frequency), time, and location (area).

The initiation monitoring means 220 monitors if a request for an optimization of the border of the shared resource is received (S220), and, if the request is received (yes in step S220), the checking means 230 checks if the request is acceptable (S230). The receiving means 240 receives an information on the rule and on at least a part of the border to which the optimization of the rule is related (S240).

The receiving means 240 may receive the information on the rule and the at least part of the border before or after the checking means 230 checks if the request is acceptable. If the information is received before the checking means 230 checks, the checking means 230 may consider the information in the checking whether or not the request is acceptable.

If the request is acceptable (yes in step S230), the negotiating means 250 negotiate on the optimization of the rule (S250). Thus, an optimized rule may be obtained. If an optimized rule is obtained (i.e., if the negotiations were successful such that an agreement on the optimized rule could be reached), the controlling means 210 controls the shared resource according to the optimized rule (S260). I.e., for the controlling means 210, the optimized rule replaces the rule.

Figure 16:
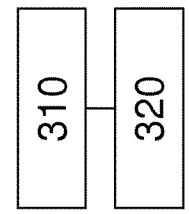
FIG. 16 shows an apparatus according to an embodiment of the invention.

FIG. 16 shows an apparatus according to an embodiment of the invention. The apparatus comprises at least one processor 210, at least one memory 220 including computer program code, and the at least one processor, with the at least one memory and the computer program code, being arranged to cause the apparatus to at least perform at least one of the methods according to FIGS. 11, 13, and 15.

Another example of an optimization is as follows: According to FIG. 2, MNO1 and MNO2 use the same spectrum at overlapping locations but at different times (border I-J-K-L in FIG. 2). Let's assume that, according to the LSA agreement, MNO1 may use the spectrum until e.g. 12:00 h and MNO2 after 12:00 h. Then, in order to allow a smooth transition, MNO1 and MNO2 may agree that MNO1 decreases its capacity on the resource from e.g. 11:30 h to 12:30 h (e.g. by reducing the number of scrambling codes or by leaving some of the base stations providing the resource in the overlap area to MNO2), and MNO2 increases its capacity on the resource correspondingly from 11:30 h to 12:30 h. Thus, for both operators, the transition may be smooth such that a huge rescheduling activity may be avoided at MNO1 shortly before 12:00 h and the spectrum is better utilized shortly after 12:00 h where MNO2 would otherwise start with a resource without users.

Each licensee may request optimization of the complete border to a neighbor. However, he may also request optimization of a part of the border, too. The other licensee may accept optimization of the complete border or the part of the border, or may make proposals for a different part of the border to optimize. In some embodiments, the optimization will be negotiated over the minimum part of the border, the optimization of which both licensees are interested in.

The number of licensees sharing LSA resources of an Incumbent is not limited to three, as according to FIG. 2. It may be any number equal to or larger than one. If there is only one licensee, it may request optimization of its border (or a part thereof) with the Incumbent. In this case, the Incumbent is to be considered like a licensee for the purpose of border optimization. If there are two or more licenses, they may optimize their mutual borders (or a part thereof), and/or their borders (or a part thereof) with the Incumbent.

In some embodiments, two Incumbents may optimize their common border, i.e. without involving a LSA licensee. In this case, both Incumbents act as licensees, and at least one of them may additionally act as licensor.

The negotiation on the optimization may be performed by more than two operators (e.g. MNOs 1 to 3 may optimize their common border A-B in FIG. 2). In these cases, the negotiation is preferably mediated by the LSA repository.

If a confirmation or acceptance is requested by one entity from another entity (e.g. messages 2, 3, 10b, 10c, 12c of FIG. 5), the requesting entity may assume confirmation or acceptance only if a corresponding confirmation or acceptance message is received in response to the request. In addition or instead, in some embodiments, it may assume confirmation or acceptance if a refusal is not received within a predefined period of time after the request. Furthermore, in some embodiments, it is assumed that an entity providing a rule has confirmed or accepted the rule.

Embodiments of the invention may be employed in a 3GPP network. They may be employed also in other mobile networks enabling LSA such as CDMA, EDGE, UMTS, LTE, LTE-A, GSM, WiFi networks, etc.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software.

According to the above description, it should thus be apparent that exemplary embodiments of the present invention provide, for example a LSA repository, or a component thereof, an apparatus embodying the same, a method for controlling and/or operating the same, and computer program(s) controlling and/or operating the same as well as mediums carrying such computer program(s) and forming computer program product(s). Furthermore, according to the above description, it should thus be apparent that exemplary embodiments of the present invention provide, for example a LSA controller, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising:
   at least one processor; and
   at least one memory,
   wherein the at least one memory is configured to, with the at least one processor, cause the apparatus at least to:
     receive a request from a first licensed shared access controller to modify one or more rules affecting a border of a shared spectrum band of the first licensed shared access controller;
     identify, in response to receiving the request, a second licensed shared access controller sharing at least a part of the border of the shared spectrum band with the first licensed shared access controller;
     transmit a message to the second licensed shared access controller indicating the request, the one or more rules, and at least the part of the border; and
     control the shared spectrum band according to the one or more rules.

2. The apparatus according to claim 1, wherein the at least one memory is further configured to, with the at least one processor, cause the apparatus at least to:
   identify the second licensed shared access controller based on information on the shared spectrum band stored in a data repository, wherein the information includes information on the one or more rules;
   monitor if a first proposal for an optimized rule is received from one of the first licensed shared access controller and the second licensed shared access controller;
   monitor if a confirmation of the first proposal is received from the other one of the first licensed shared access controller and the second licensed shared access controller; and
   store, if the confirmation is received, the first proposal in the data repository as information on the optimized rule.

3. The apparatus according to claim 2, wherein the at least one memory is further configured to, with the at least one processor, cause the apparatus at least to:
   forward the first proposal for the optimized rule received from the one of the first licensed shared access controller and the second licensed shared access controller to the other one of the first licensed shared access and second licensed shared access controller; and
   be prevented from considering that the confirmation is received if the confirmation is not received in response to the forwarding of the first proposal.

4. The apparatus according to claim 3, wherein the at least one memory is further configured to, with the at least one processor, cause the apparatus at least to:
   supervise if the first proposal matches a first predefined rule; and
   prevent the forwarding of the first proposal if the first proposal does not match the first predefined rule.

5. The apparatus according to claim 2, wherein the at least one memory is further configured to, with the at least one processor, cause the apparatus at least to:
   consider that the confirmation is received if:
     a second proposal for the optimized rule is received from the other one of the first licensed shared access controller and the second licensed shared access controller from which the first proposal is received; and
     the second proposal corresponds to the first proposal.

6. The apparatus according to claim 2, wherein the at least one memory is further configured to, with the at least one processor, cause the apparatus at least to:
   supervise if the first proposal matches a second predefined rule; and
   at least one of:
     prevent the storing of the first proposal if the first proposal does not match the second predefined rule; and
     provide an agreement information to at least one of the first licensed shared access controller and the second licensed shared access controller if the first proposal matches the second predefined rule.

7. The apparatus according to claim 1, wherein the at least one memory is further configured to, with the at least one processor, cause the apparatus at least to:
   inform the second licensed shared access controller of the request; and
   monitor if a negotiation acceptance is received from the second licensed shared access controller in response to being informed of the request,
   wherein the second licensed shared access controller is informed of at least one of the one or more rules and the part of the border only if the negotiation acceptance is received.

8. The apparatus according to claim 1, wherein the at least one memory is further configured to, with the at least one processor, cause the apparatus to at least one of:
   inform the second licensed shared access controller of an identification of the first licensed shared access controller; and inform the first licensed shared access controller of an identification of the second licensed shared access controller.

9. An apparatus, comprising:
at least one processor; and
at least one memory,
wherein the at least one memory is configured to, with the at least one processor, cause the apparatus at least to:
receive a request from a first licensed shared access controller to modify one or more rules affecting a border of a shared spectrum band of the first licensed shared access controller;
identify, in response to receiving the request, a second licensed shared access controller sharing at least a part of the border of the shared spectrum band with the first licensed shared access controller based on information on the shared spectrum band stored in a data repository, wherein the information includes information on the rule;
transmit a message to the second licensed shared access controller indicating the request, the one or more rules, and at least the part of the border;
monitor if a first proposal for an optimized rule is received from one of the first licensed shared access controller and the second licensed shared access controller;
forward the first proposal for the optimized rule received from the one of the first licensed shared access controller and the second licensed shared access controller to the other one of the first licensed shared access and second licensed shared access controller;
monitor if a confirmation of the first proposal is received from the other one of the first licensed shared access controller and the second licensed shared access controller;
avoid considering that the confirmation is received if the confirmation is not received in response to the forwarding of the first proposal;
store, if the confirmation is received, the first proposal in the data repository as information on the rule; and
control the shared spectrum band according to the one or more rules.

10. An apparatus, comprising:
at least one processor; and
at least one memory,
wherein the at least one memory is configured to, with the at least one processor, cause the apparatus at least to:
receive a request from a first licensed shared access controller to modify one or more rules affecting a border of a shared spectrum band of the first licensed shared access controller;
identify, in response to receiving the request, a second licensed shared access controller sharing at least a part of the border of the shared spectrum band with the first licensed shared access controller based on information on the shared spectrum band stored in a data repository, wherein the information includes information on the rule;
transmit a message to the second licensed shared access controller indicating the request, the one or more rules, and at least the part of the border;
monitor if a first proposal for an optimized rule is received from one of the first licensed shared access controller and the second licensed shared access controller;
monitor if a confirmation of the first proposal is received from the other one of the first licensed shared access controller and the second licensed shared access controller;
consider that the confirmation is received if a second proposal for the optimized rule is received from the other one of the first licensed shared access controller and the second licensed shared access controller from which the first proposal is received, and the second proposal corresponds to the first proposal;
store, if the confirmation is received, the first proposal in the data repository as information on the rule; and
control the shared spectrum band according to the one or more rules.

* * * * *